US012703466B1

(12) United States Patent
Rosario-Gonzalez et al.

(10) Patent No.: US 12,703,466 B1
(45) Date of Patent: Aug. 11, 2026

(54) SYSTEMS AND METHODS FOR PAIRING MARINE VESSELS WITH DOCKING STATIONS

(71) Applicant: Brunswick Corporation, Mettawa, IL (US)

(72) Inventors: Efrain Rosario-Gonzalez, Rockledge, FL (US); Troy J. Kollmann, New Smyrna Beach, FL (US); Trevor George, Savoy, IL (US); Eric T. Surma, Ormond Beach, FL (US)

(73) Assignee: Brunswick Corporation, Mettawa, IL (US)

( * ) Notice: Subject to any disclaimer, the term of this patent is extended or adjusted under 35 U.S.C. 154(b) by 319 days.

(21) Appl. No.: 18/482,499

(22) Filed: Oct. 6, 2023

(51) Int. Cl.
*B63C 1/04* (2006.01)
*G05D 1/00* (2024.01)

(52) U.S. Cl.
CPC ............. *B63C 1/04* (2013.01); *G05D 1/0206* (2013.01)

(58) Field of Classification Search
CPC ........... B63C 1/04; G05D 1/0206; G08G 3/00
See application file for complete search history.

(56) References Cited

U.S. PATENT DOCUMENTS

| | | | | |
|---|---|---|---|---|
| 7,561,886 | B1 | 7/2009 | Gonring et al. | |
| 9,904,293 | B1 | 2/2018 | Heap et al. | |
| 10,372,976 | B2 | 8/2019 | Kollmann et al. | |
| 10,633,072 | B1 | 4/2020 | Arbuckle et al. | |
| 10,845,812 | B2 | 11/2020 | Ward et al. | |
| 2016/0240086 | A1 * | 8/2016 | Nicodemus | G08G 3/00 |
| 2025/0171118 | A1 * | 5/2025 | Kadobayashi | B63B 51/00 |

* cited by examiner

*Primary Examiner* — Aaron L Troost
(74) *Attorney, Agent, or Firm* — Andrus Intellectual Property Law, LLP

(57) ABSTRACT

A docking station system for marine vessels is provided. The system includes multiple marine vessels, each of the marine vessels having a navigation system configured to determine a position of the marine vessel, and multiple docking stations. Each of the docking stations is located on a dock structure and is configured to provide a designated location to dock at least one marine vessel. The system further includes a control system configured to execute a calibration process wherein the control system receives and stores the positions of each of the docking stations based on position data collected by the navigation system when one of the plurality of marine vessels is docked at the docking station. The control system is further configured to detect that one of the marine vessels needs docking and to pair the marine vessel that needs docking to one of the docking stations.

20 Claims, 7 Drawing Sheets

SYSTEMS AND METHODS FOR PAIRING MARINE VESSELS WITH DOCKING STATIONS

FIELD

The present disclosure relates to a system of multiple marine vessels, and more particularly, to systems and methods of pairing the marine vessels with one or more docking stations located on one or more dock structures.

BACKGROUND

The following U.S. patents and patent applications are hereby incorporated herein by reference.

U.S. Pat. No. 7,561,886 is directed to a method by which a position of a marine vessel can be determined relative to a stationary object, such as a dock. Two position sensors are attached to a marine vessel and a microprocessor, onboard the marine vessel, computes various distances and angular relationships between the position sensors on the marine vessel and stationary transponders attached to the fixed device, such as a dock. The various dimensions and angular relationships allow a complete determination regarding the location and attitude of a marine vessel relative to the dock. This information can then be used by a maneuvering program to cause the marine vessel to be berthed at a position proximate the dock.

U.S. Pat. No. 9,904,293 is directed to a system for automatically trailering a marine vessel that includes a set of coded tags coupled to a boat trailer, each storing data regarding its location on the trailer. A tag reader is located aboard the vessel, and estimates a first distance to a first coded tag in the set and a second distance to a second coded tag in the set. A position determination module uses the first and second estimated distances to determine position and heading of the vessel and the trailer in a given coordinate system. A feedback control module calculates a difference between the positions of the vessel and the trailer and a difference between the headings of the vessel and the trailer and determines vessel movements required to minimize the position and heading differences. A marine propulsion system automatically actuates a propulsion device to produce the required vessel movements to propel the vessel onto the trailer.

U.S. Pat. No. 10,372,976 is directed to an object detection system for a marine vessel having at least one marine drive that includes at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 10,633,072 is directed to a method for positioning a marine vessel that includes receiving a measured actual position of the vessel and determining a first error between the actual position of the vessel and a desired target position of the vessel. In response to the first error being in a fore/aft direction of the vessel, the method includes commanding a first subset of marine propulsion devices in a plurality of marine propulsion devices to produce thrust to minimize the first error in the fore/aft direction, as appropriate, while a remainder of the marine propulsion devices in the plurality do not produce thrust. The method thereafter includes commanding the first subset of marine propulsion devices to cease producing thrust. The method may also include selecting whether to actuate all marine propulsion devices in the plurality of marine propulsion devices or a first subset thereof based on a magnitude and a direction of the first error.

U.S. Pat. No. 10,845,812 is directed to a system that controls movement of a marine vessel near an object. The system includes a control module in signal communication with a marine propulsion system, a manually operable input device providing a signal representing a requested translation of the marine vessel, and a sensor providing a first distance between the vessel and a first point on the object and a second distance between the vessel and a second point on the object. The control module determines an actual angle between the vessel and the object based on the first distance and the second distance. In response to the signal representing the requested translation, the control module stores the actual angle between the vessel and the object as an initial angle and controls the marine propulsion system to produce thrust that will carry out the requested translation and that will maintain the initial angle.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one embodiment of the present disclosure, a docking station system for marine vessels is provided. The system includes multiple marine vessels, each of the marine vessels having a navigation system configured to determine a position of the marine vessel, and multiple docking stations. Each of the docking stations is located on a dock structure and is configured to provide a designated location to dock at least one marine vessel. The system further includes a control system configured to execute a calibration process wherein the control system receives and stores the positions of each of the docking stations based on position data collected by the navigation system when one of the plurality of marine vessels is docked at the docking station. The control system is further configured to detect that one of the marine vessels needs docking and to pair the marine vessel that needs docking to one of the docking stations.

According to another embodiment of the present disclosure, a method of operating a docking station system for marine vessels is provided. The method includes providing multiple marine vessels, each of the marine vessels having a navigation system configured to determine a position of the marine vessel and providing multiple docking stations, each of the docking stations located on a dock structure and configured to provide a designated location to dock at least one of the marine vessels. The method further includes executing a calibration process to receive and store positions of each of the docking stations based on position data collected by the navigation system when one of the plurality of marine vessels is docked at the docking station, detecting that one of the plurality of marine vessels needs docking, and pairing the marine vessel that needs docking to one of the plurality of docking stations.

BRIEF DESCRIPTION OF THE DRAWINGS

The present disclosure is described with reference to the following Figures.

DETAILED DESCRIPTION

The present inventors have recognized that improvements in both autonomous navigation systems located on marine vessels and position locating systems, such as systems utilizing real-time kinematics (RTK), affords the opportunity for a fully autonomous system of marine vessels and docking stations. While autonomous docking systems aid the operator by automatically controlling propulsion of the vessel so that successful docking is achieved, existing systems rely on an operator to choose a suitable docking location for the vessel.

The systems and methods of the present disclosure provide further improvements by removing the need for the operator to choose a suitable docking station for the vessel. Rather, a master control system associated with at least one docking station controls assignment of docking stations to vessels that are in need of docking. In some instances, the master control system may even detect a vessel that needs docking (e.g., an electrically-powered vessel with a low battery charge level) and instruct the vessel to dock at a particular station (e.g., a station that can provide charging). Once a high location accuracy calibration process has been performed to determine the position of one or more docking stations, the master control system can transmit the locations of the paired stations to the vessels that need docking, thereby permitting the vessels to autonomously navigate to the paired stations. As a result, the level of operator knowledge and skill to operate a vessel in such a system is significantly reduced and decisions regarding docking locations and charging locations of a fleet of marine vessels can be centralized and optimized.

Figure 1:
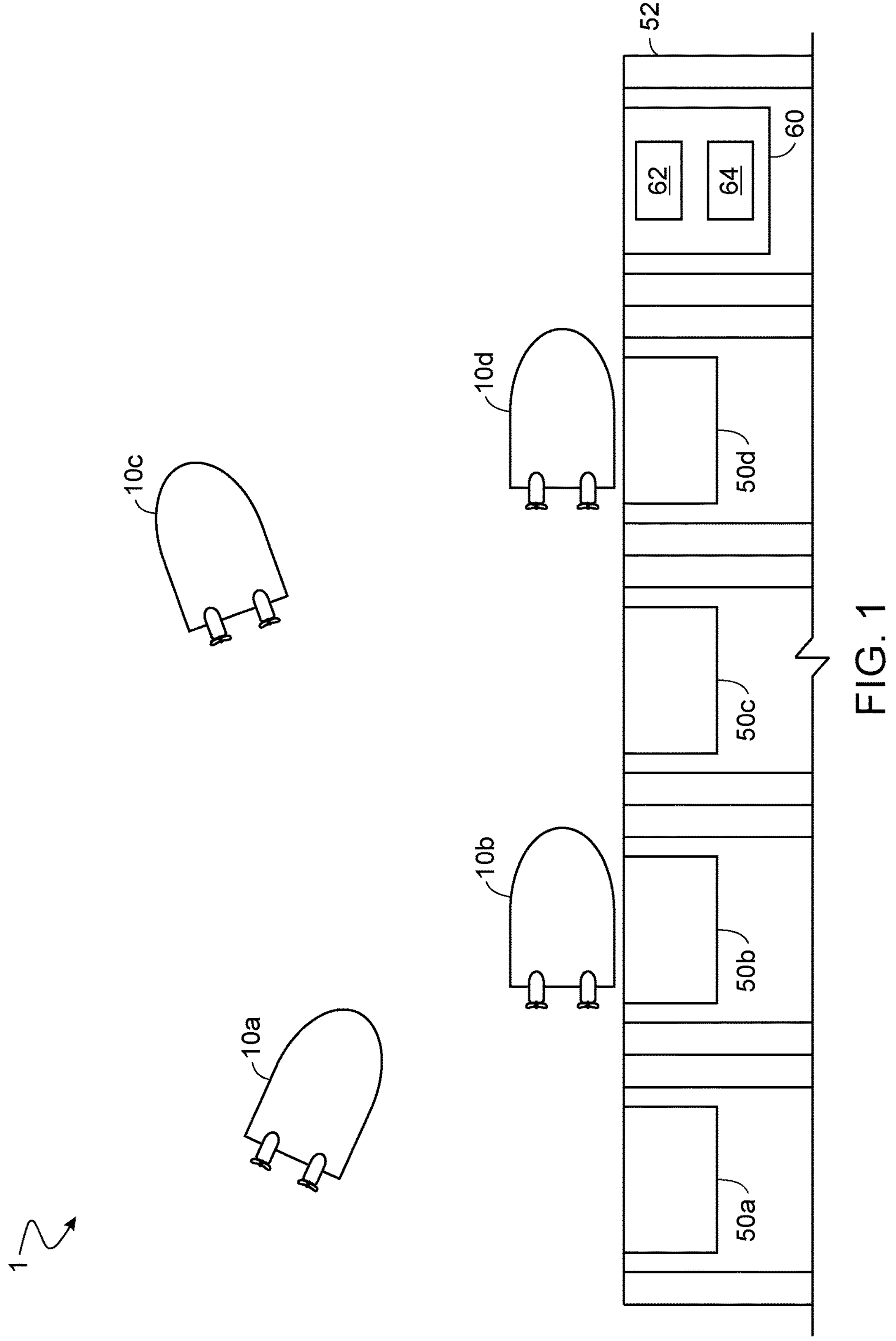
FIG. 1 schematically depicts a docking station system for marine vessels according to an exemplary embodiment of the present disclosure.

FIG. 1 depicts an exemplary docking station system 1 according to the present disclosure. The system 1 is shown to include multiple marine vessels 10*a*-10*d*. The type of marine vessel is not particularly limited, and in various embodiments, could include a personal watercraft, a jet boat, a speed boat, a fishing boat, a luxury watercraft and/or the like. The system 1 is further shown to include multiple docking stations 50*a*-50*d* located on a dock structure 52. Each of the docking stations 50*a*-50*d* provides a designated location at the dock structure 52 to dock at least one of the marine vessels 10*a*-10*d*. In an exemplary embodiment, each of the docking stations 50*a*-50*d* is located on a single dock structure 52; however, in other embodiments, the docking stations 50*a*-50*d* may be located on multiple and/or separate dock structures 52. For example, the docking station system 1 is installed at a small manmade lake and the system 1 may include two or more docking structures 52 located on different sides of the lake with one or more docking stations 50 located on each of the docking structures 52.

Each of the docking stations 50*a*-50*d* may perform a variety of functions for the marine vessels 10*a*-10*d* and their operators aside from providing a designated location to dock. In some embodiments, and as described in further detail below, the marine vessels 10*a*-10*d* may include rechargeable power storage systems (e.g., batteries) that power electric propulsion devices and/or house loads on the vessel. Accordingly, the docking stations 50*a*-50*d* may include systems for battery charging or connection to shore power. In further embodiments, the docking station system 1 may comprise a boat rental or reservation system, and the docking stations 50*a*-50*d* may include an operator interface or alert system that provides operators with information about the boat and indicates which boat has been reserved. For example, in such an embodiment, an operator may reserve a boat, and once a particular vessel has been assigned to the reservation, a light on the docking station may illuminate in a particular color or a chime may sound to direct the operator to the assigned docking station and vessel. Once the operator reaches the assigned docking station, an operator interface display device may display a vessel operator's manual, time left in reservation, or any other information that may be helpful to the operator in operating the vessel.

The docking station system 1 is further shown to include a master docking station 60. The master docking station 60 may include a master control system 62 that is programmable and includes a processing system and a storage system. The master control system 62 may be configured to receive and store locations of each of the docking stations 50*a*-50*d* during a calibration process (see FIGS. 3A-3D and 4), and to transmit those locations to one or more of the marine vessels 10*a*-10*d* operating in the docking station system 1. Such receiving and transmitting functions may be accomplished via any suitable wireless network (e.g., WiFi, Bluetooth, cellular).

The master control system 62 may further perform processing and assignment functions to associate vessels that need docking with available docking stations. For example, as shown in FIG. 1, marine vessel 10*a* may be headed toward the docking structure 52 and may automatically transmit a message to the master docking station 60 once the vessel is within a particular distance threshold of the docking structure 52 to request a docking location. The master control system 62 may query or lookup the docking stations that are currently assigned to other vessels, and may determine that vessel 10*b* is docked at station 50*b*, vessel 10*d* is docked at station 50*d*, and stations 50*a* and 50*c* are available for docking. In some embodiments, the master control system 62 may assign a vessel that needs docking to a docking station based on the features and/or characteristics of the vessel and docking stations. For example, if vessel 10*a* transmits a low battery status message to the master docking station 60 along with a request for docking, the master control system 62 may assign the vessel 10*a* to dock at station 50*d* rather than station 50*a* if station 50*d* contains a battery charging system and station 50*a* does not.

The master docking station 60 may further include a high accuracy locating system 64 that is communicably coupled to the master control system 62 and is configured to provide a known location of the master docking station 60 that permits the other components of the docking station system 1 to be determined with extremely high accuracy. For example, while global navigation satellite system (GNSS) receivers (e.g., GPS receivers) alone have a location accuracy that typically ranges from 1-4 meters, incorporation of the high accuracy locating system 64 may increase the location accuracy to the order of centimeters, rather than meters. Although the FIGURES of the present disclosure depict the master control system 62 and the high accuracy locating system 64 as located within docking station 60, in other embodiments, one or both of master control system 62 and the high accuracy locating system 64 could be located or housed elsewhere within the docking station system 1.

In an exemplary embodiment, the high accuracy locating system 64 is a real-time kinematics (RTK) base station which may comprise an antenna and GNSS receiver with known and fixed coordinates. Traditional GNSS receivers measure how long it takes for a signal to travel from satellites to the receiver, and by sending multiple signals to multiple satellites, the position of the receiver can be determined via trilateration. However, signals can be distorted by the atmosphere, leading to errors in position of several meters, as described above. RTK technology minimizes such errors by calculating GNSS errors based on the known and fixed coordinates of the base station and computing position corrections that are transmitted to roving GNSS receivers (e.g., GPS receivers on the marine vessels 10) via radio or internet communications, which use these position corrections to correct the real time positions of the receivers relative to the base station. In some embodiments, the high accuracy locating system 64 may utilize Wi-Fi signal triangulation using Time Difference of Arrival (TDOA). For example, if the docking stations 50*a*-50*d* are located near or underneath buildings or other structures that attenuate satellite signals, then TDOA, which provides position accuracy on the order of 3-5 m, could be used in conjunction with imaging systems (e.g., imaging devices 22, see FIG. 2 and further description below) and artificial intelligence to direct vessels 10*a*-10*d* to docking stations 50*a*-50*d*.

Figure 2:
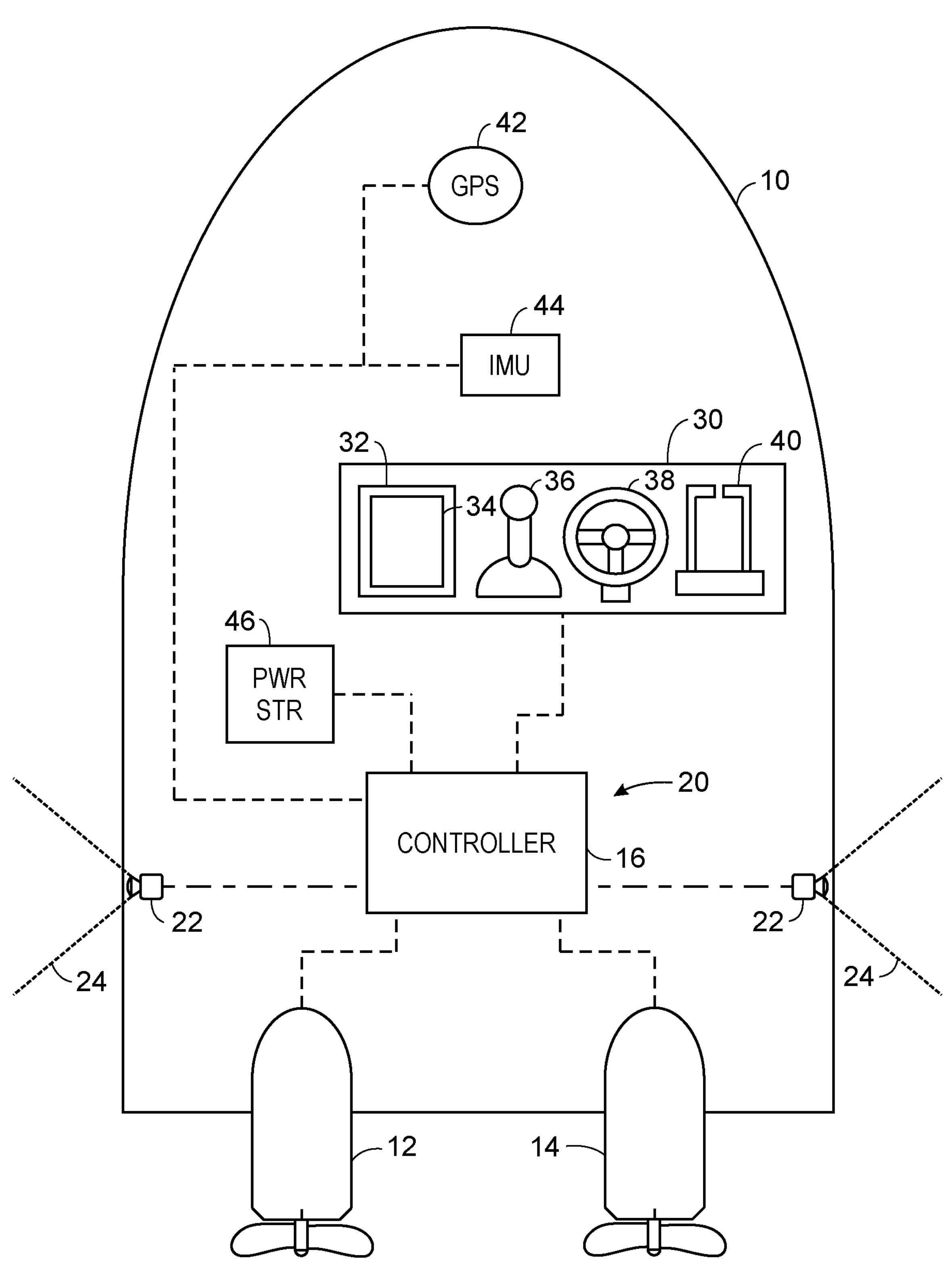
FIG. 2 schematically depicts a marine vessel that can be utilized with the docking station system of FIG. 1.
Figure 3A:
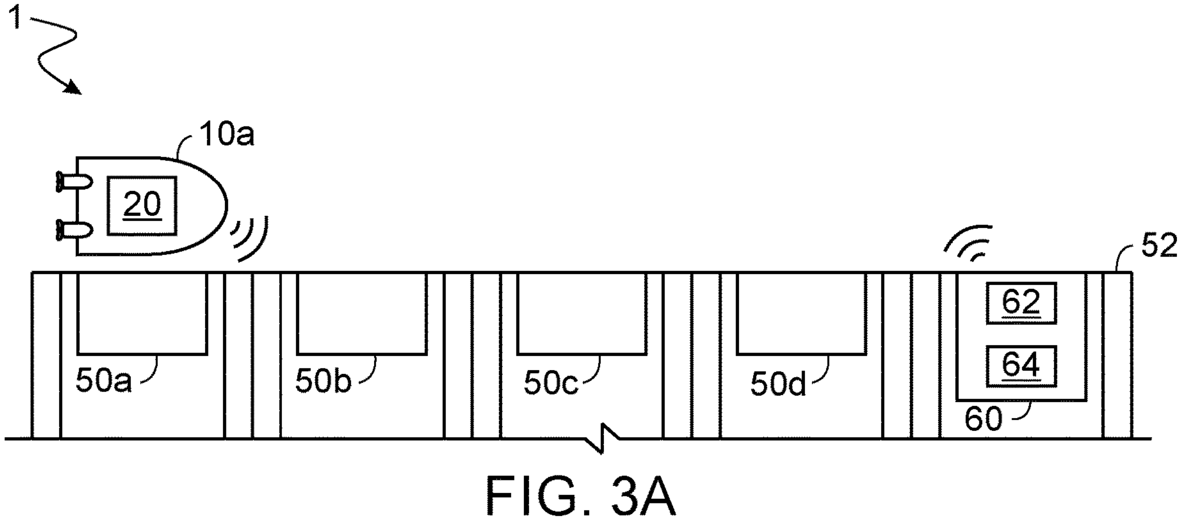
FIGS. 3A-3D schematically depicts a calibration process for the docking station system of FIG. 1.
Figure 3B:
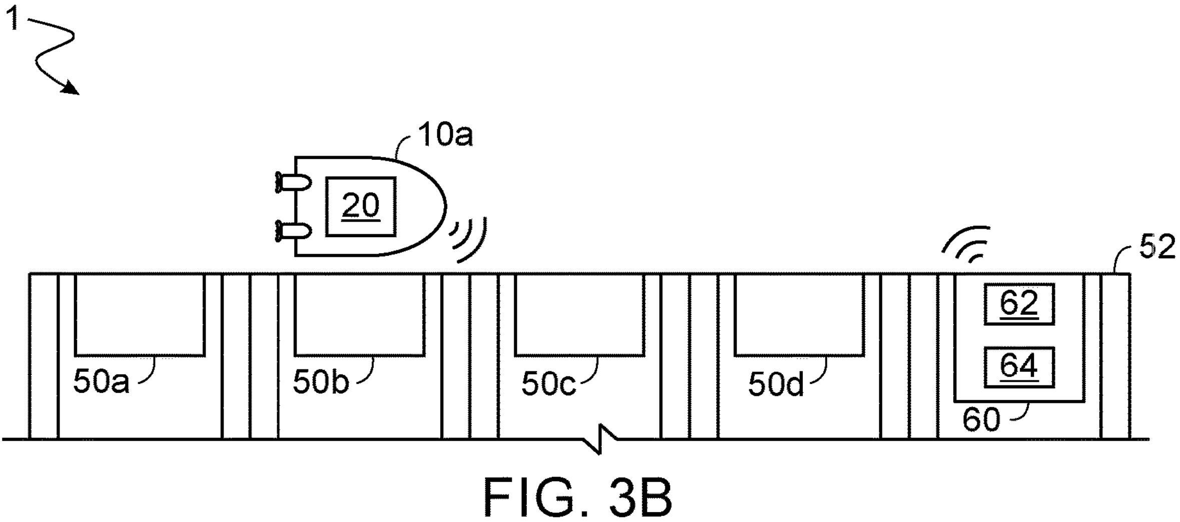
Figure 3C:
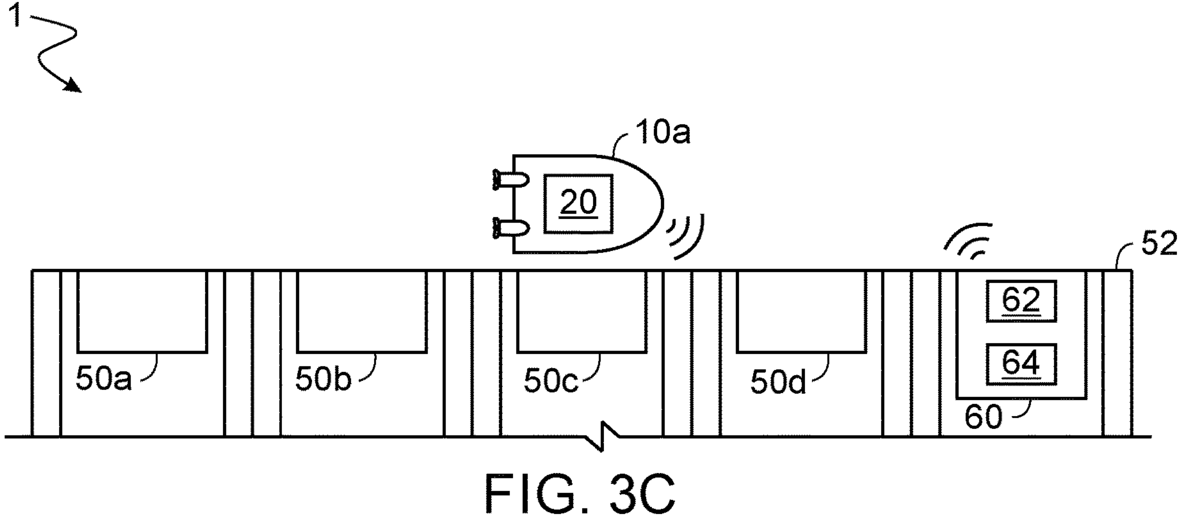
Figure 3D:
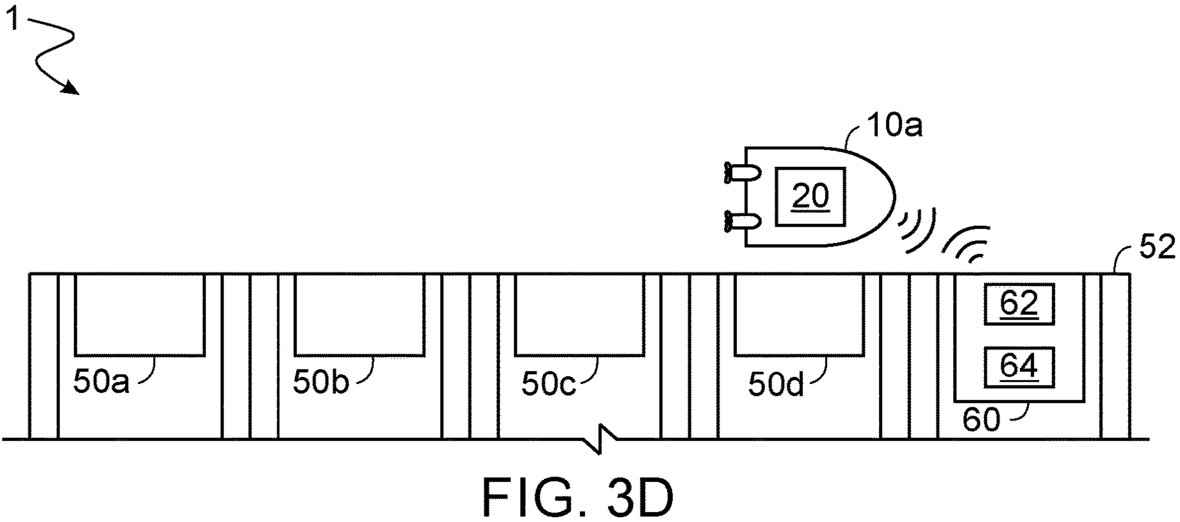

A more detailed schematic of a marine vessel 10 that can be utilized in the docking station system 1 is provided in FIG. 2. The vessel 10 includes a marine navigation system 20 including a plurality of marine drives 12, 14. The type of marine drive is not particularly limited, and may include outboard motors as shown. In other embodiments, the marine drives 12, 14 may be inboard motors, stern drives, etc. The vessel controller 16 controls the magnitudes and directions of thrusts provided by the propulsion devices 12, 14. In one embodiment, the marine drives 12, 14 may include electric motors that a powered via a power storage device 46 (e.g., a marine battery or batteries). In other embodiments, the marine drives 12, 14 include internal combustion systems, and the power storage drive 46, if present, may be utilized to power a house load on the marine vessel 10.

The marine vessel 10 is further shown to include several imaging devices 22 that sense images of a marine environment around the marine vessel 10. The imaging devices 22 may be visual image sensors—e.g., cameras that sense visual light to create still images or video images-infrared image sensors, sonar image sensors, radar image sensors, etc. Each imaging device 22 has a field of view 24, respectively, which is the area captured, or imaged, by the respective imaging device.

A command console 30 of the marine navigation system 20 includes an electronic navigation device 32 having an operator interface 34. The electronic navigation device 32 can facilitate the waypoint tracking, station keeping, and or auto-docking modes, such as by providing to the vessel controller 16 a desired track including a series of waypoints and/or a graphic depiction of an area where the vessel 10 is to be electronically anchored and/or moored. For example, the electronic navigation device 32 can be a chart plotter. A joystick 36 and a steering wheel 38 are also provided at the command console 30, and can provide steering commands to the propulsion devices 12, 14 via the vessel controller 16, as is known. A pair of throttle/shift levers 40 is also provided, and the levers 40 are moveable between forward, neutral, and reverse positions, which signal the vessel controller 16 to command corresponding shift positions and speeds of the propulsion devices 12, 14, as is also known.

The marine navigation system 20 also includes a position determination device 42. Vessel position measurement is performed utilizing a global navigation satellite system (GNSS), such as a GPS constellation, GLONASS (GLObalnaya NAvigatsionnaya Sputnikovaya Sistema), Galileo, or a BeiDou system, as non-limiting examples. In some embodiments, navigation data sources may also include GNSS devices, or receivers, that operate in conjunction with an orientation and/or motion sensing system 44 such as an Inertial Measurement Unit (IMU), Inertial Navigational Unit (INU), and/or an Inertial Navigation System (INS).

Still referring to FIG. 2, the vessel controller 16 is programmable and includes a processing system and a storage system. The vessel controller 16 can be located anywhere on the vessel 10 and/or located remote from the vessel 10 and can communicate with various components of the vessel 10 via a peripheral interface and wired and/or wireless links. Portions of the method disclosed herein below can be carried out by a single controller or by several separate controllers.

FIGS. 3A-3D depict an exemplary calibration process that may be performed by various components of the docking station system 1 to accurately locate the positions of the docking stations 50*a*-50*d* utilizing one of the marine vessels as a calibrating marine vessel (e.g., marine vessel 10*a*). The calibrating marine vessel 10*a* may be any marine vessel having a navigation system 20 that includes a position determining device (e.g., GPS receiver 42, see FIG. 2). In an exemplary embodiment, as shown in FIGS. 3A-3D, a single marine vessel 10*a* may be utilized in the calibration process by docking at each of the docking stations 50*a*-50*d* that require location calibration in succession. In other exemplary embodiments, two or more calibrating marine vessels (e.g., marine vessels 10*a* and 10*b*) may be utilized in the calibration process simultaneously.

Responsive to the master control system 62 of the master docking station 60 commanding initiation of a calibration process, the calibrating marine vessel 10*a* docks at each of the docking stations 50*a*-50*d*, as shown in the progression of FIGS. 3A-3D. The master control system 62 may command the calibration process at various regular intervals, or when certain conditions indicating a need for calibration are satisfied. Once the calibrating marine vessel 10*a* has navigated to each docking station 50*a*-50*d* and is positioned in the designated location provided at each docking station 50*a*-50*d*, the calibrating marine vessel 10*a* transmits its location as determined by its navigation system 20. The master docking station 60 may store the dimensions of the calibrating marine vessel 10*a* such that the locations of the docking stations 50*a*-50*d* can be calculated based on the transmitted locations of the calibrating marine vessel 10*a*. In various embodiments, the calibrating marine vessel 10*a* may determine that it is properly positioned in the designated location at each of the docking stations 50_a_-50_d_ based on the imaging devices 22 on the calibrating marine vessel 10_a_ detecting a color band, number, 1D or 2D barcode, or some other visual cue provided on each of the docking stations 50_a_-50_d_. In other embodiments, each of the docking stations 50_a_-50_d_ could include an RFID tag that could be read by the calibrating marine vessel 10_a_. In an exemplary embodiment, the transmitted locations from the marine vessel 10_a_ may have their accuracy improved by position corrections transmitted to the navigation system 20 from the high accuracy locating system 64.

Figure 4:
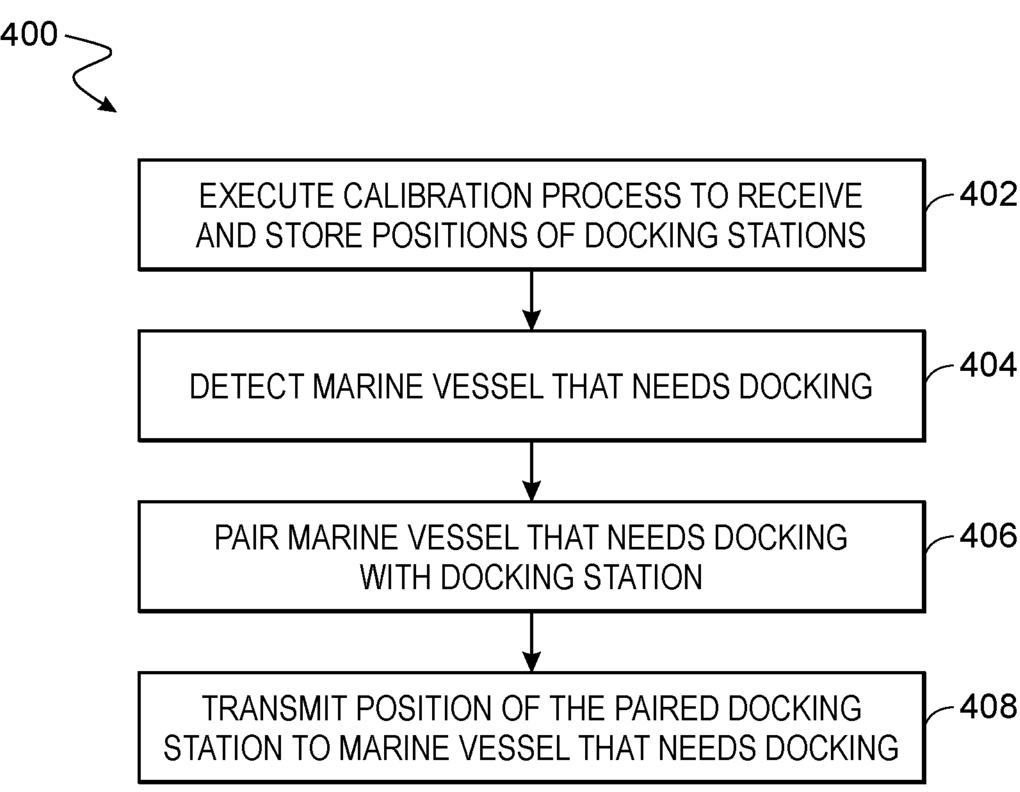
FIG. 4 is a flowchart depicting a method of pairing a docking station with a marine vessel that needs docking for the docking station system of FIG. 1.

Referring now to FIG. 4, a method 400 of pairing a docking station with a marine vessel that needs docking for the docking station system 1 is depicted. In an exemplary embodiment, method 400 is performed primarily by the master control system 62 of the master docking station 60. Method 400 commences with step 402, in which the master control system 62 executes a calibration process to receive and store positions of each of the docking stations 50_a_-50_d_. As described above with reference to FIGS. 3A-3D, the calibration process may include one or more designated calibrating marine vessels 10_a_-10_d_ docking at each of the docking stations 50_a_-50_d_ provided in the docking station system 1, and transmitting their locations to the master docking station 60, such that the master docking station can determine the locations of the docking stations 50_a_-50_d_ based on the locations of the calibrating marine vessels.

At step 404, the master control system 62 determines that a marine vessel 10_a_-10_d_ within the docking station system 1 needs docking. Such a determination may be responsive to various events and conditions. In one embodiment, the operator of the marine vessel 10_a_-10_d_ may manually request a docking location, for example, using the operator interface 34 of the electronic navigation device 32. In another embodiment, the vessel controller 16 may automatically transmit a request for a docking location once the vessel detects it is within a certain threshold distance of the docking structure 52, or when it detects that a charge level of a power storage device 46 has dropped below a minimum threshold charge level. Various other vessel conditions that could automatically trigger a request for a docking location include, but are not limited to, a problem or potential problem with the propulsion system or power storage device 46 (e.g., high battery temperature detected, high motor temperature detected, high motor current) or an error in the navigation system 20. In still further embodiments, the marine vessel may be reserved for a designated amount of time, and the master control system 62 may determine that the marine vessel needs docking as soon as the designated amount of time has elapsed. Still further conditions that could automatically trigger a request for docking could include a non-critical vessel issue or fault that needs inspection, or the need to complete a vessel maintenance cycle. [

Continuing with step 404, the master control system 62 pairs the vessel that needs docking with one of the docking stations 50_a_-50_d_. The criteria utilized by the master control system 62 to complete the pairing is not particularly limited. For example, the master control system 62 may pair the vessel that needs docking with the docking station 50_a_-50_d_ that is closest to the vessel, or the docking station 50_a_-50_d_ that would provide the shortest walking distance for guests to embark or disembark. As another example, if the vessel that needs docking includes a rechargeable power storage device, the master control system 62 may be sure to pair the vessel with a docking station 50_a_-50_d_ that includes charging architecture. In some instances, if multiple docking stations 50_a_-50_d_ draw power from a single charge controller, the master control system 62 may direct load sharing across the stations 50_a_-50_d_ to ensure high charging efficiency and prioritization of charging of vessels with low states of charge. In still further examples, the master control system 62 may assign the vessel to a docking station 50_a_-50_d_ randomly, or on a rotating basis such that each docking station 50_a_-50_d_ is utilized for docking with similar frequency. Method 400 concludes at step 408, as the master control system 62 transmits the location of the paired docking station to the vessel that needs docking. In various embodiments, such transmission permits an operator of the vessel that needs pairing to navigate to the paired docking station, via manual or automatic navigation. Such transmission may also permit a charging port of a vessel that needs docking to align with a charging system on the paired docking station.

Figure 5:
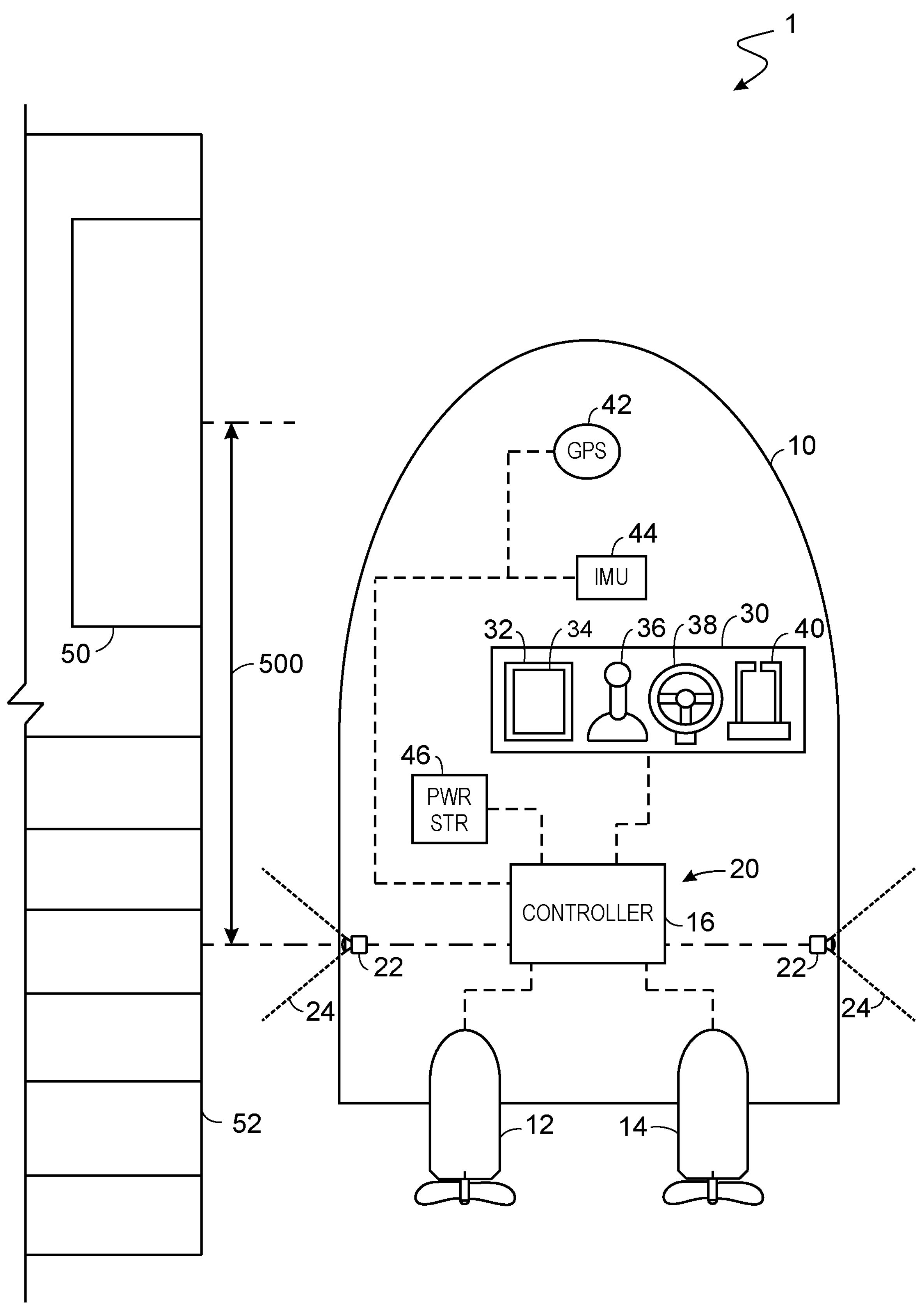
FIG. 5 schematically depicts an imaging process for the docking station system of FIG. 1.

Turning now to FIG. 5, an imaging process for the docking station system 1. As shown, the marine vessel 10 may be instructed to dock at a paired docking station 50 according to instructions received from the master control system 62. Such instructions may include the location of the docking station 50. The marine vessel 10 may automatically navigate to the transmitted location of the docking station 50, and once the vessel 10 is docked at the docking structure 52, imaging devices 22 may capture images of the docking structure 52, which may include the docking station 50.

Figure 6:
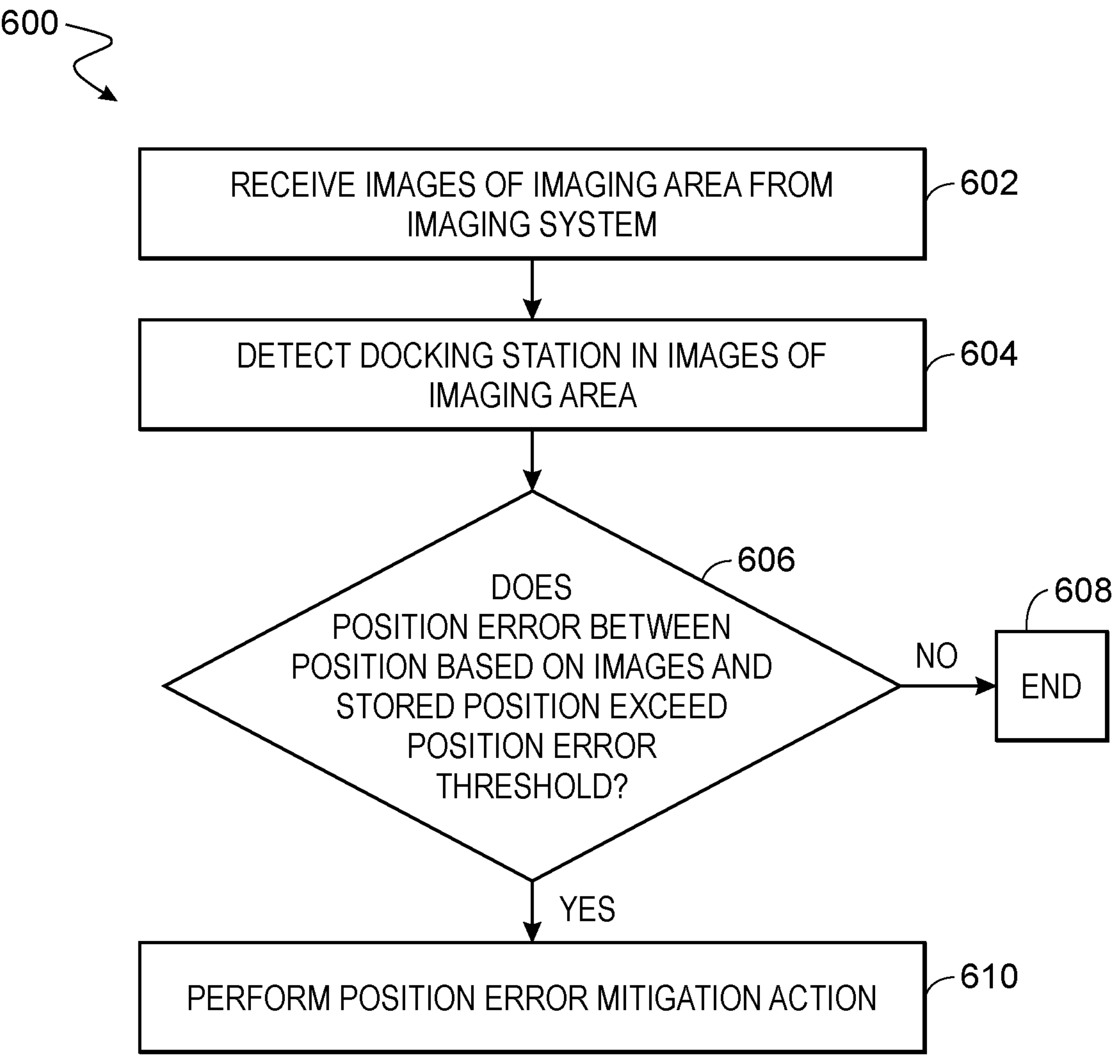
FIG. 6 is a flowchart depicting a method of detecting and responding to docking station position error for the docking station system of FIG. 1.

FIG. 6 depicts a method 600 for detecting and responding to a docking station position error for the docking station system 1. In an exemplary embodiment, method 600 is performed by the master control system 62 in communication with the vessel controller 16 and imaging devices 22. Method 600 commences at step 602, in which the vessel controller 16 and/or the master control system 62 receives images of an imaging area captured from one or more imaging devices 22. At step 604, a docking station (e.g., docking station 50, see FIG. 5) is detected in the images of the imaging area. The process of detecting a particular object within images captured by an imaging device may be substantially similar to the processes described in U.S. Pat. No. 10,372,976, incorporated herein by reference in its entirety.

At step 606, the master control system 62 determines if the error between the position of the docking station as captured in the images and the stored location of the docking station exceeds a position error threshold. Such position error is indicated by arrow 500 of FIG. 5. If the position error does not exceed a position error threshold stored in master control system 62, method 600 ends at step 608. If, however, the position error does exceed the position error threshold, method 600 concludes at step 610, as the master control system 62 performs a position error mitigation action. The position error threshold may be correlated with the accuracy of the locating technology. For example, the position error threshold could be 125% of the minimum accuracy for the technology involved. As both GNSS-only and Wi-Fi technologies have minimum accuracies of around 5 m (i.e., GNSS-only technology is able to locate positions within 1-5 m accuracy, Wi-Fi is able to locate positions within 3-5 m accuracy), the position error threshold for systems employing GNSS-only or Wi-Fi locating systems could be 6.25 m. In some embodiments, the position error mitigation action may include the master control system 62 transmitting a message to the operator (e.g., via the operator interface 34 of the electronic navigation device 32) indicating that the stored position of the docking station is incorrect. Responsive to such an error message, an operator may opt to rely on manual methods for navigating to docking stations and/or connecting a charging port on the marine vessel to a charging system on the docking station. In another embodiment, the position error mitigation action may include the master control system 62 triggering a re-calibration process for the stored positions of one or more of the docking stations 50*a*-50*d*. Such a re-calibration process may be substantially similar to the calibration process depicted in FIGS. 3A-3D, with a calibrating marine vessel 10*a* or vessels docking at one or more of the docking stations 50*a*-50*d* and transmitting their positions to the master control system 62. In various embodiments, the position error mitigation action may depend on the magnitude of the error. For example, a small amount of position error may trigger the message to the operator, while a larger amount may trigger performance of the re-calibration process before one or more of the marine vessels 10*a*-10*d* can resume automatic navigation to or other functions involving the docking stations 50*a*-50*d*.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A docking station system for marine vessels, the system comprising:

a plurality of marine vessels, each of the plurality of marine vessels comprising a navigation system configured to determine a position of the marine vessel;

a plurality of docking stations, each of the plurality of docking stations located on a dock structure and configured to provide a designated position to dock at least one of the plurality of marine vessels; and a control system configured to:

execute a calibration process wherein it receives and stores the positions of each of the plurality of docking stations based on position data collected by the navigation system when one of the plurality of marine vessels is docked at the docking station;

detect that one of the plurality of marine vessels needs docking; and pair the marine vessel that needs docking to one of the plurality of docking stations.

2. The system of claim 1, wherein the control system is configured to transmit the position of the paired docking station to the marine vessel that needs docking such that the marine vessel that needs docking can automatically navigate to the paired docking station.

3. The system of claim 1, wherein the control system is configured to detect that the marine vessel needs docking based on a request generated by an operator of the marine vessel that needs docking.

4. The system of claim 1, wherein the control system is configured to automatically detect that the marine vessel needs docking based on a status of a power storage device located on the marine vessel that needs docking.

5. The system of claim 1, wherein the control system is configured to automatically detect that the marine vessel needs docking based on the marine vessel that needs docking moving within a predetermined distance of any dock structure.

6. The system of claim 1, wherein:

at least one of the plurality of docking stations comprises a charging station configured to charge a power storage device on the marine vessel when the marine vessel is docked at the charging station; and the position of the charging station stored in the control system is used to align a charging port on the marine vessel with the charging station.

7. The system of claim 1, wherein:

each of the plurality of marine vessels further comprises an imaging system configured to capture images of an imaging area proximate the marine vessel; and wherein the control system is further configured to:

receive the images of the imaging area from the imaging system;

detect one of the plurality of docking stations in the images of the imaging area;

determine whether a position error between a global position of the docking station based on the images of the imaging area and the stored position of the docking station from the calibration process exceeds a position error threshold; and responsive to a determination that the position error exceeds a position error threshold, perform a position error mitigation action.

8. The system of claim 7, wherein the position error mitigation action comprises performing a re-calibration process such that the control system receives and stores an updated position of at least one of the plurality of docking stations based on position data collected by the collected by the navigation system when one of the plurality of marine vessels is docked at the docking station.

9. The system of claim 1, wherein:

one of the plurality of docking stations is a master docking station having a high accuracy locating system configured to determine a position of the master docking station; and the positions of each of the docking stations are determined relative to the position of the master docking station.

10. The system of claim 9, wherein the high accuracy locating system is a real-time kinematics (RTK) base station.

11. A method of operating a docking station system for marine vessels, comprising:

providing a plurality of marine vessels, each of the plurality of marine vessels comprising a navigation system configured to determine a position of the marine vessel;

providing a plurality of docking stations, each of the plurality of docking stations located on a dock structure and configured to provide a designated position to dock at least one of the plurality of marine vessels;

executing a calibration process to receive and store positions of each of the plurality of docking stations based on position data collected by the navigation system when one of the plurality of marine vessels is docked at the docking station;

detecting that one of the plurality of marine vessels needs docking; and pairing the marine vessel that needs docking to one of the plurality of docking stations.

12. The method of claim 11, wherein the method further includes transmitting the position of the paired docking station to the marine vessel that needs docking such that the marine vessel that needs docking can automatically navigate to the paired docking station.

13. The method of claim 11, wherein detecting that one of the plurality of marine vessels needs docking is based on a request generated by an operator of the marine vessel that needs docking.

14. The method of claim 11, wherein detecting that one of the plurality of marine vessels needs docking is based on a status of a power storage device located on the marine vessel that needs docking.

15. The method of claim 11, wherein detecting that one of the plurality of marine vessels needs docking is based on the marine vessel that needs docking moving within a predetermined distance of any dock structure.

16. The method of claim 11, wherein:

at least one of the plurality of docking stations comprises a charging station configured to charge a power storage device on the marine vessel when the marine vessel is docked at the charging station; and the position of the charging station stored is used to align a charging port on the marine vessel with the charging station.

17. The method of claim 11, wherein:

each of the plurality of marine vessels further comprises an imaging system configured to capture images of an imaging area proximate the marine vessel; and wherein the method further includes:

receiving the images of the imaging area from the imaging system;

detecting one of the plurality of docking stations in the images of the imaging area;

determining whether a position error between a global position of the docking station based on the images of the imaging area and the stored position of the docking station from the calibration process exceeds a position error threshold; and responsive to a determination that the position error exceeds a position error threshold, performing a position error mitigation action.

18. The method of claim 17, wherein the position error mitigation action comprises performing a re-calibration process including receiving and storing an updated position of at least one of the plurality of docking stations based on position data collected by the collected by the navigation system when one of the plurality of marine vessels is docked at the docking station.

19. The method of claim 11, wherein:

one of the plurality of docking stations is a master docking station having a high accuracy locating system configured to determine a position of the master docking station; and the positions of each of the docking stations are determined relative to the position of the master docking station.

20. The method of claim 19, wherein the high accuracy locating system is a real-time kinematics (RTK) base station.

* * * * *